US008989461B2

(12) United States Patent
Zhu et al.

(10) Patent No.: US 8,989,461 B2
(45) Date of Patent: Mar. 24, 2015

(54) METHOD OF DEFORMABLE MOTION CORRECTION AND IMAGE REGISTRATION IN X-RAY STENT IMAGING

(75) Inventors: Ying Zhu, Monmouth Junction, NJ (US); Liping Zhou, Seattle, WA (US)

(73) Assignee: Siemens Aktiengesellschaft, Munich (DE)

(*) Notice: Subject to any disclaimer, the term of this patent is extended or adjusted under 35 U.S.C. 154(b) by 405 days.

(21) Appl. No.: 13/469,311

(22) Filed: May 11, 2012

(65) Prior Publication Data
US 2013/0301897 A1  Nov. 14, 2013

(51) Int. Cl.
*G06K 9/00* (2006.01)
*G06K 9/62* (2006.01)
*G06T 3/00* (2006.01)
*G06T 5/50* (2006.01)
*G06T 7/00* (2006.01)

(52) U.S. Cl.
CPC ............ *G06T 3/0068* (2013.01); *G06K 9/6207* (2013.01); *G06T 5/50* (2013.01); *G06T 7/0028* (2013.01); *G06T 2207/10016* (2013.01); *G06T 2207/10121* (2013.01); *G06T 2207/30021* (2013.01); *G06T 2207/30048* (2013.01); *G06T 2207/30101* (2013.01); *G06T 2207/30204* (2013.01)
USPC .......................................... 382/128; 382/132

(58) Field of Classification Search
CPC .... A61B 6/12; A61B 2576/02; A61B 5/0033; A61B 6/00; G06T 7/00; G06T 2207/10016; G06T 2207/10121; G06T 2207/30021; G06T 2207/30048; G06T 2207/30101; G06T 2207/30204; G06T 3/0068; G06T 5/50; G06T 7/0012; G06T 7/0028; G06K 9/32; G06K 9/40
See application file for complete search history.

(56) References Cited

U.S. PATENT DOCUMENTS 7,734,328 B2 * 6/2010 Vaillant et al. ................. 600/426

OTHER PUBLICATIONS

V. Bismuth, R. Vaillant, F. Funck, N. Guillard, and L. Najman, "A comprehensive study of stent visualization enhancement in X-ray images by image processing means", Medical Image Analysis, Aug. 2011, pp. 565-576, vol. 15, No. 4, Oxford University Press.
W. T. Freeman and E. H. Adelson, "The design and use of steerable filters", IEEE Transactions on Pattern Analysis and Machine Intelligence, Sep. 1991, pp. 891-906, vol. 13, No. 9, IEEE.
S. Lee, G. Wolberg and S. Y. Shin, "Scattered data interpolation with multilevel B-splines", IEEE Transactions on Visualization and Computer Graphics, Jul.-Sep. 1997, pp. 228-244, vol. 3, No. 3, IEEE.
Y. Zhu, C. Chefd'Hotel, and P. Durlak, "Deformable Motion Correction for Stent Visibility Enhancement", MICCAI 2011 Workshop: Computer Vision for Intravascular and Intracardiac Imaging Organizers, 2011.

* cited by examiner

Primary Examiner — Tom Y Lu

(57) ABSTRACT

A method (100) that provides image processing of X-ray images that is particularly effective for the alignment of stent images and that, ultimately, provides stent image quality enhancement.

18 Claims, 9 Drawing Sheets

METHOD OF DEFORMABLE MOTION CORRECTION AND IMAGE REGISTRATION IN X-RAY STENT IMAGING

FIELD OF INVENTION

The present invention generally relates to X-ray imaging. More particularly, the present invention relates to coronary stent visualization enhancement in X-ray images.

BACKGROUND OF THE INVENTION

Coronary artery disease is one of the most common causes of sudden death. This disease tends to narrow the lumen of coronary arteries due to arterial wall plaque progression or plaque rupture. This narrowing or stenosis results in the flow of blood through a coronary artery to become obstructed or partially obstructed. Coronary artery stenosis may be treated by medication or by surgical intervention. In one surgical procedure, a fine metallic mesh called a stent is implanted in an affected artery wall and expanded in order to open the narrowed lumen and restore the blood flow. The procedure is typically performed under the guidance of X-ray fluoroscopy which delivers real time video of the clinical tools and devices in the patient's anatomy. Briefly, a metallic guide-wire is first introduced inside the affected artery in order to serve as support for sliding an angioplasty balloon equipped with a stent. In order to visually assess the location of the balloon/stent on the guide-wire, the guide-wire is equipped with two highly radio-opaque markers or marker-balls delimiting the position and extent of the devices. This is described in more detail in an article by V. Bismuth, R. Vaillant, F. Funck, N. Guillard, and L. Najman, entitled, "A comprehensive study of stent visualization enhancement in X-ray images by image processing means", Medical Image Analysis. vol. 15, no. 4, pp. 565-576, August 2011. FIG. 1 depicts a typical X-ray image of an artery with a guide-wire 10, two markers-balls 12, and a respective stent 14 between the two balls 12. It is clear that accurate assessment of the anatomical location of the stent deployment in relation to the artery vessel walls is key to the success of the procedure and the safety of the patient.

Image processing techniques for X-ray fluoroscopy images are routinely employed to enhance stent visibility and visualization and, thus, support such accurate assessments. Assuming that the stent is well aligned throughout the sequence of images, integrating a sequence of non-contrast stent images to produce a single stent image (via image processing techniques) can effectively improve the contrast and the signal-to-noise ratio (SNR) of the respective stent image. However, in coronary artery intervention, the coronary arteries undergo constant movement and motion correction of their images is nearly always required. Moreover, motion correction of the coronary artery images becomes imperative for aligning a temporal series of stent images to ensure the quality of the enhanced stent image. It is therefore advantageous to have an image processing method that is particularly effective for the alignment of stent images and that, ultimately, provides stent image quality enhancement.

SUMMARY OF THE INVENTION

The aforementioned problems are obviated by the present invention which provides a method of stent visualization in X-ray images, comprising: detecting points representing markers of a respective guide-wire on each X-ray image in a sequence of X-ray stent images and, from the detected points, forming pairs of markers and building tracks of pairs for the images; removing static background from the images; detecting the location of the respective guide-wire, and placing the same number of control points on the guide-wire for each stent image; performing marker-based rigid alignment of the multiple stent images with the static background removed; and performing non-rigid alignment of the multiple stent images. The method may further comprise integrating the multiple aligned stent images to produce a single stent image with reduced noise and enhanced contrast.

The step of performing non-rigid alignment may comprise reconstructing a stent deformation field from nonuniform, distribution of data points. Alternatively, performing non-rigid alignment may comprise multi-level B-spline approximation and stent-based elastic registration processes. In such case, the multi-level B-spline approximation may be used to find the initial correspondences of the multiple stent images by computing a C2-continuous surface through a set of control points of the guide-wires. Also, the stent-based elastic registration may be used to determine the stent deformation by utilizing the local image information around the stent.

The present invention also provides a method of image quality enhancement for X-ray stent images, comprising: locating the guide-wire, associated with a respective stent, for each X-ray image frame in a sequence of frames; tracking the movement of the respective stent as the stent moves from frame to frame; and aligning the stent in its corresponding location throughout the sequence of frames. The aligning the stent step may comprise performing motion correction of the guide-wires. The step of locating the guide-wire may comprise a curve detection with the weighted shortest path or a model-based guide-wire detection. In such case, locating the guide-wire may be based on ridge images acquired through extracting edges from original stent images. Further, acquiring ridge images may comprise: implementing a ridge filtering algorithm to the image sequence for ridge detection for each image; applying the algorithm on multiple bandwidths; combining the results on a plurality of bandwidths into a ridge image for each image; performing tensor voting for the ridge images by applying a Hessian matrix; and obtaining a ridge image with a respective gap-filled guide-wire.

Alternatively, locating the guide-wire may comprise finding the weighted shortest path between two marker points that delimit the position and extent of the guide-wire and the stent. In such case, finding the weighted shortest path may comprise evaluating the cost of each candidate path by taking into consideration the length of the respective path, the average intensity of the measure points in the path, and the curvature of the path. A candidate path may comprise, at least, one of the marker points as the starting point, a neighbor of the starting point, and the second marker point. Also, finding the weighted shortest path may comprise evaluating the cost of each candidate path using a cost function defined by the following: Cost $(path_i)=\alpha \times Length + \beta \times average\ (weight) + \gamma \times curvature$, where Length is the length of a respective path; weight is the maximum intensity of a ridge image minus the intensity of a respective current point, said ridge image being acquired through extracting edges from a respective original stent image, and curvature is calculated by three connected measure points in the path.

Alternatively, locating the guide-wire may comprise creating models of a guide-wire with different shapes and finding the best matched model based on the shape of the respective guide-wire. In such case, creating guide-wire models may comprise modeling a respective guide-wire by a set of parametric curves defined as arcs which go through two marker points that delimit the position and extent of the guide-wire and the stent. The step of finding the best matched model may comprise comparing the created models with a ridge image, said ridge image being acquired through extracting edges from a respective original stent image. Further, the comparing step may comprise comparing the created models with a ridge image using a similarity measure defined by the following equation:

$$\frac{1}{MN}\sum_i\sum_j \frac{1}{2\pi\sigma^2}\exp\left(\frac{-((x_i - mx_j)^2 + (y_i - my_j)^2)}{2\sigma^2}\right),$$

where $(x_i, y_i)$ represents the respective data point in the ridge image; $(mx_j, my_j)$ represents the corresponding point on the curve model; N is the total number of points in the ridge image; M is the total number of points on the curve model; and $\sigma^2$ is the bandwidth of the Gaussian kernel used to define the model.

The present invention may also provide an X-ray imaging system, comprising an imager that images an anatomical area of a subject to acquire X-ray image data and a control system that manipulates the acquired image data and stored image data to produce X-ray images of the anatomical area and that automatically derives multiple aligned stent images in order to provide stent image quality enhancement in the X-ray images in the anatomical area. The control system may automatically derive multiple aligned stent images by detecting the guide-wire in the multiple stent images, edit the guide-wire images, and perform both rigid stent alignment and non-rigid stent alignment.

BRIEF DESCRIPTION OF THE DRAWINGS

For a better understanding of the present invention, reference is made to the following description of an exemplary embodiment thereof, and to the accompanying drawings, wherein:

FIG. 6b is an illustration of curve models generated from two marker points in the ridge image of FIG. 6a;

DETAILED DESCRIPTION

Figure 1:
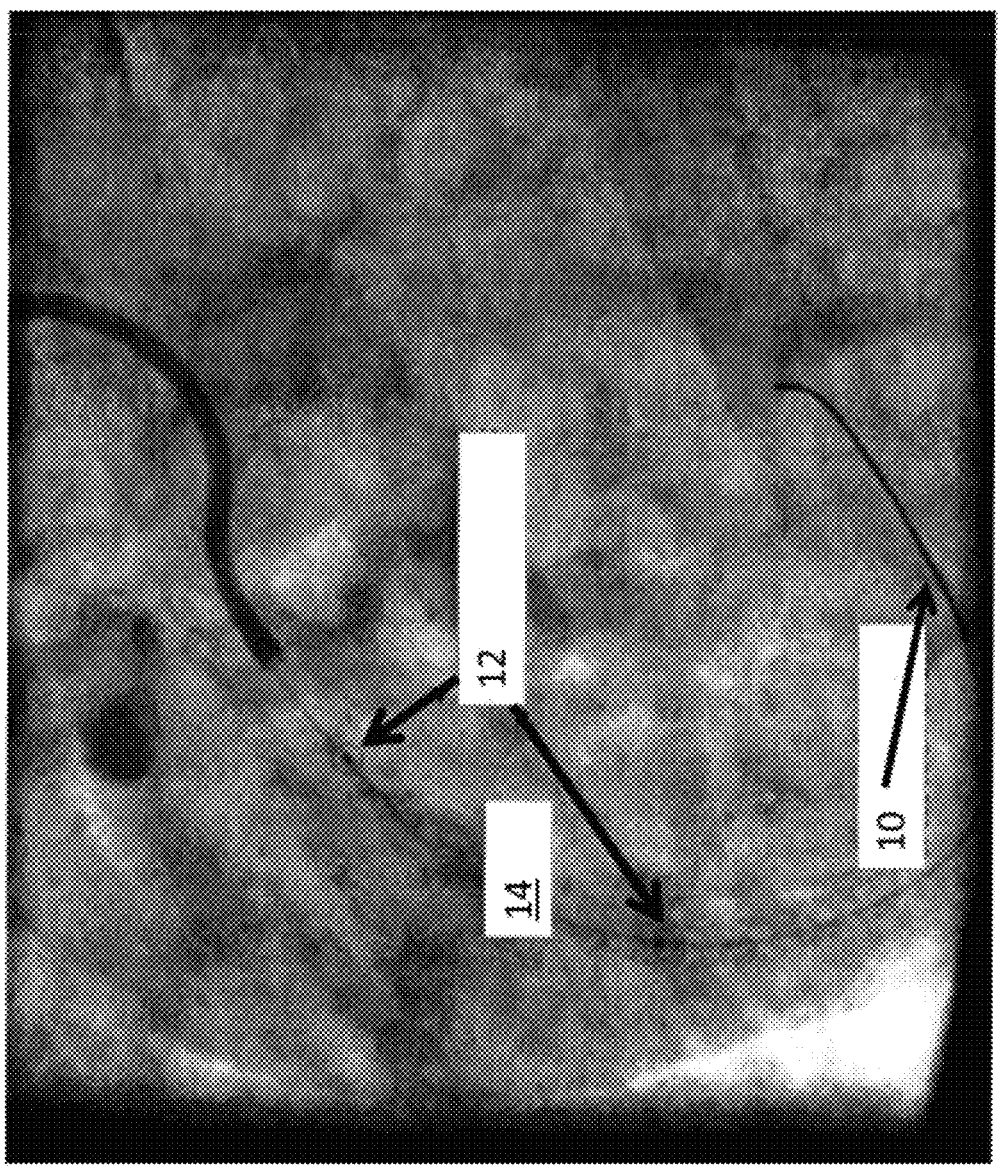
FIG. 1 is a typical X-ray image showing the placement of a stent in an artery.
Figure 2:
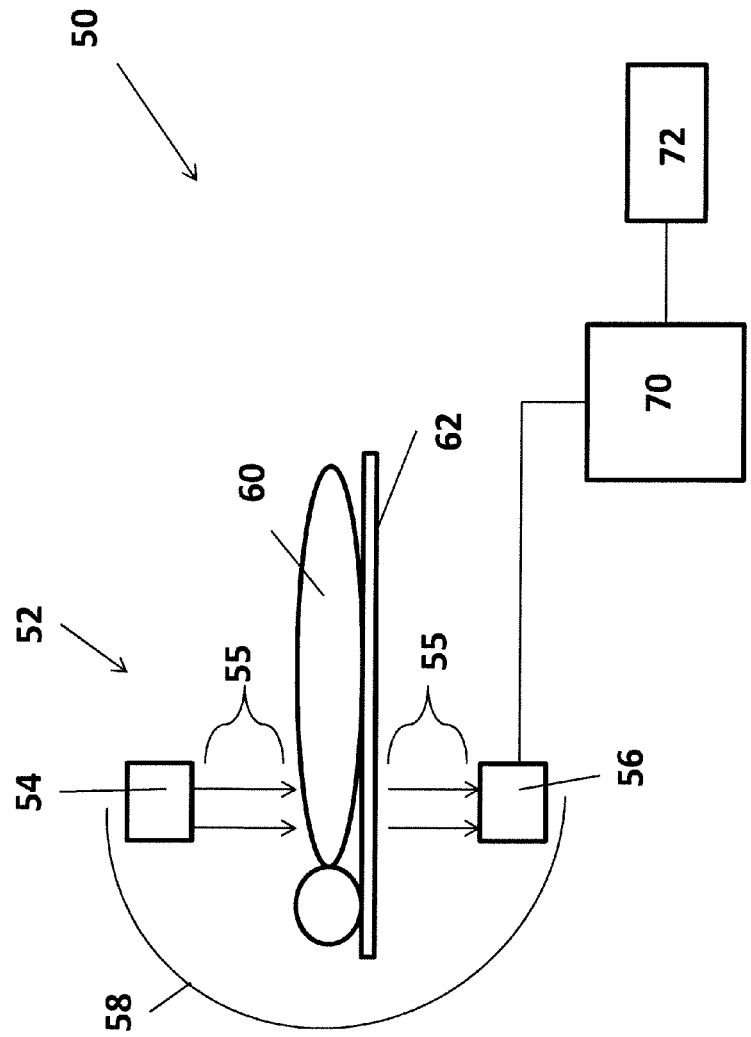
FIG. 2 is a block diagram of an X-ray imaging system operable in accordance with the present invention.

FIG. 2 is a block diagram of an X-ray imaging system 50 (simplified) that operates in accordance with the present invention. The system 50 comprises an X-ray imaging apparatus 52 having an X-ray source 54 that generates X-ray beams 55 towards an X-ray detector 56. The X-ray source 54 and the X-ray detector 56 may be mounted on opposite ends of, and coupled to one another via, a C-arm gantry arrangement 58. A patient to be imaged 60 is positioned on a support table 62 between the two components 54, 56 such that the X-ray beams 55 pass through the patient 60, and in particular, the coronary region of interest, and project onto the X-ray detector 56. The detector 56 converts the raw 2D X-ray projections into image data signals for subsequent processing by the X-ray imaging system 50.

The X-ray imaging apparatus 52 is operably coupled to a computer system 70 which controls the operation of the X-ray imaging system 50 and its components and processes the image data obtained from the X-ray detector 56 to transform them into a visual representation of the patient's vasculature structure (i.e., reconstructed images of the vasculature structure). In particular, the computer system 70 operates on the image data using well-known mathematical image processing and reconstruction algorithms/techniques, such as segmentation, Fourier transforms, etc., and generates for display, storage, and/or other usage corresponding X-ray images. The computer system 70 is also operably connected to appropriate user interfaces 72, like displays, storage media, input/output devices, etc.

The various components of the X-ray imaging system 50 are conventional and well known components. However, the computer system 70 is adapted to permit the X-ray imaging system 50 to operate and to implement methods in accordance with the present invention, for example, as shown in FIG. 3.

Figure 3:
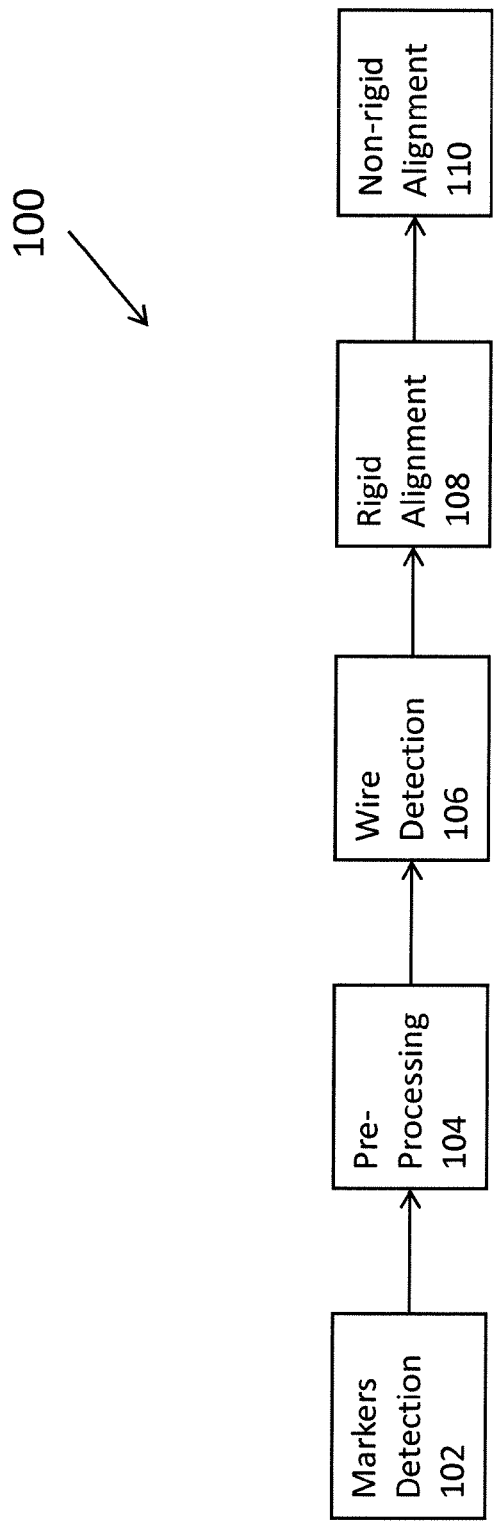
FIG. 3 is flow chart of a method carried out in accordance with the present invention.

FIG. 3 is a flow chart of an image processing method 100 implemented in accordance with the present invention. The method 100 generally comprises five steps: markers detection 102, image preprocessing 104, guide-wire detection 106, rigid stent alignment 108 and non-rigid stent alignment 110. In the first step 102, the computer system 70 operates on the image data (i.e., the sequence of stent images) and detects points representing markers, marker-balls or balloon markers (as discussed above) in the sequence of stent images. The computer system 70 then uses the detected points to form pairs of markers and build tracks of pairs for the images. The computer system 70 pre-processes the images in order to remove static background from the respective multiple stent images (Step 104). Next, the computer system 70 automatically detects the location of a respective guide-wire, and places the same number of control points on the guide-wire for each stent image (Step 106). In the fourth step 108, the computer system 70 performs marker-based rigid alignment of the multiple stent images with the static background removed. Finally, the computer system 70 performs non-rigid alignment of the multiple stent images (Step 110). This includes multi-level B-spline approximation (MBA) and stent-based elastic registration processes. Generally, MBA is a technique for reconstructing a deformation field (or graphing/fitting a surface) from scattered, or nonuniform, distribution of data points. MBA is used to find the initial correspondences of the multiple stent images by computing a C2-continuous surface through a set of control points of the guide-wires. A C2-continuous surface is a well-known term in the curve/surface rendering art that generally describes a resulting surface with third-level parametric continuity. Stent-based elastic registration is used to determine the stent deformation by utilizing the local image information around the stent. This final step 110 also includes integrating the multiple aligned stent images to produce a single stent image with reduced noise and enhanced contrast.

As noted above, in the method 100, the computer system 70 automatically detects the location of a respective guide-wire. However, detecting guide-wires is known to be a difficult problem because of a guide-wire's characteristics. In particular, guide-wires are typically only 3 to 5 pixels wide and have a low contrast to noise ratio. Several known techniques may be used to perform this sub-step. The present invention provides two novel techniques that may be utilized by the method 100. In a first new technique, a curve detection method may be implemented by finding the potential line between two marker points. In a second new technique, a model-based wire detection approach creates models of a respective guide-wire with different shapes and finds the best matched model based on the shape of the guide-wire.

Figure 4:
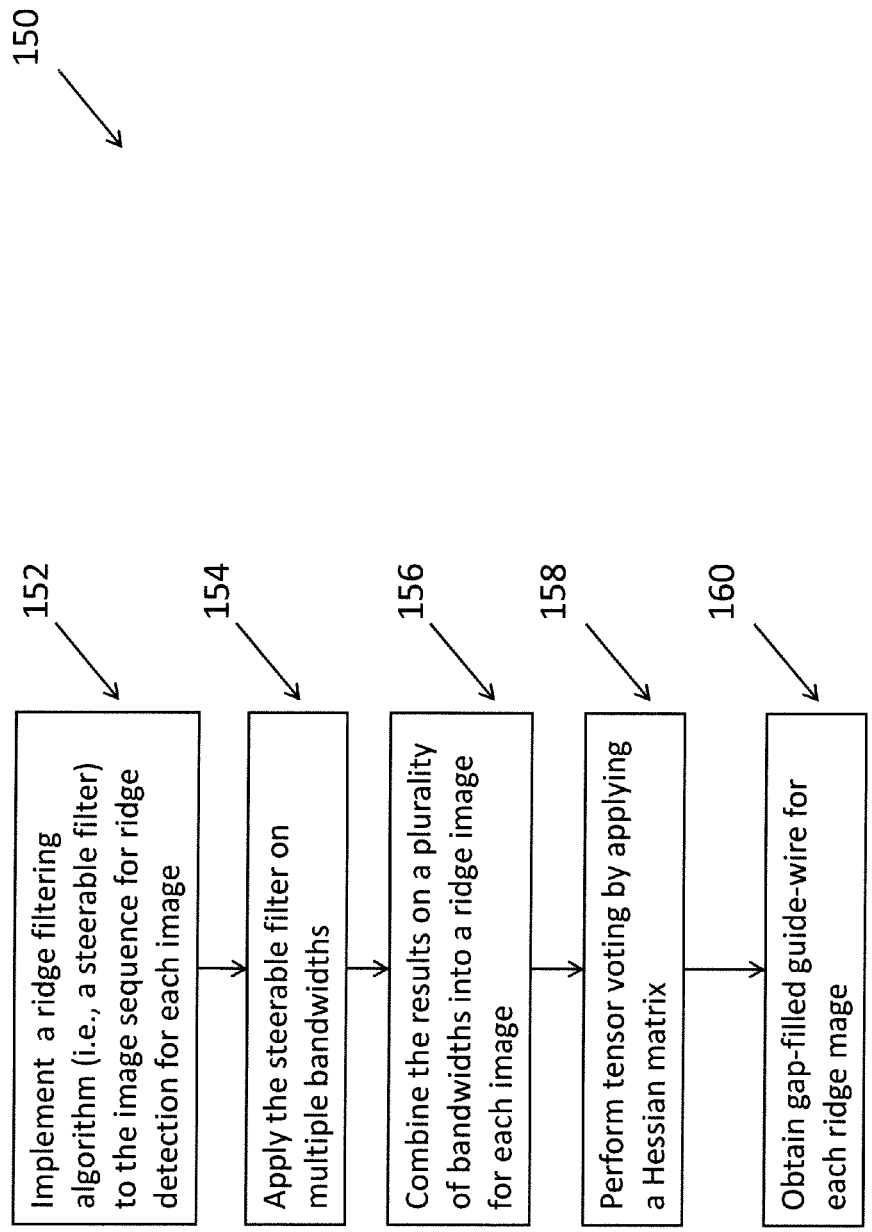
FIG. 4 is a flow chart of a ridge images acquisition process (generalized)

The two novel wire-detection techniques/algorithms are based on ridge images acquired through extracting edges from original stent images. FIG. 4 shows a flow chart of a generalized ridge images acquisition process 150. In the first step (Step 152), a ridge filtering algorithm is applied to the image sequence to obtain the ridge image for each image. Specifically, a steerable filter with multiple bandwidths is implemented for the task of ridge detection for each image. The steerable filter functions to synthesize filters of arbitrary orientation from linear combinations of basis filters (this is described in more detail in an article by W. T. Freeman and E. H. Adelson, entitled "The design and use of steerable filters", IEEE Transactions on Pattern Analysis and Machine Intelligence, vol. 13, no. 9, pp. 891-906, September 1991, which is hereby incorporated by reference). The steerable filter is then applied on a plurality of bandwidths, for example, filter kernels with values of the bandwidth parameter of 1.8, 2.0, and 2.8, in the next step (Step 154). The results on the plurality of bandwidths are then combined into a ridge image (for each original stent image) (Step 156). However, because of the typical poor image quality of the original image, the resulting ridge image is not good enough in views of visualization and visibility for most cases. For example, usually, there is too much noise in some ridge images, in addition to the ridges of a guide-wire and deployed stent, or there are some gaps in the guide-wires. In other words, the connectivity of the data/image points of guide-wires is not satisfactory. Therefore, in order to fill the gaps within guide-wires from the ridge image, the Hessian filter (which describes the local curvature of a function with many variables) is applied to do tensor voting (which provides perceptual grouping to complete image elements with noise or missing data) (Step 158). The following equations are used by the computer system 70 for this purpose:

$$H = \sum \begin{bmatrix} I_x^2(X) & I_x I_y(X) \\ I_x I_y(X) & I_y^2(X) \end{bmatrix} \quad (1)$$

$$\sum = [V_2, V_1] \begin{bmatrix} w_2 & 0 \\ 0 & w_1 \end{bmatrix} \begin{bmatrix} V_2^T \\ V_1^T \end{bmatrix} \quad (2)$$

In the process of tensor voting, each ridge point in the respective ridge image serves as a token (i.e., an input value). The input tokens are first encoded as tensors by using the Hessian matrix (shown in equation (1) above) and the initial tensors are decomposed into two basic tensors in two orientations. In the novel wire detection techniques of the present invention, the eigenvalues and eigenvectors of the Hessian matrix are used to define two tensors in orthogonal directions. In fact, the eigenvector associated with the largest eigenvalue indicates the direction of largest change (least consistent) and the eigenvector associated with the smallest eigenvalue defines the direction of least change (most consistent). The two tensors are assigned with different weights: a) the direction of least change with higher weight and b) the direction of largest change with lower weight. In equation (1), the matrix H represents the Hessian matrix which is the accumulation of the derivation matrices for a local patch of points, where $I_x$ and $I_y$ are the respective derivatives (of pixel intensity) in the x and y direction at point X of a respective ridge image. The off-diagonal entries are the product of $I_x$ and $I_y$, while the diagonal entries are the squares of the respective derivatives. In equation (2), $V_1$ and $V_2$ are the eigenvectors of H which represent two orientations, and $w_2$ and $w_1$ are the weights for the two orientations. By the vote addition of the input tokens, the quality of the respective ridge image can be improved with better connectivity between image/data points which were previously missing or incomplete (Step 160).

Figure 5:
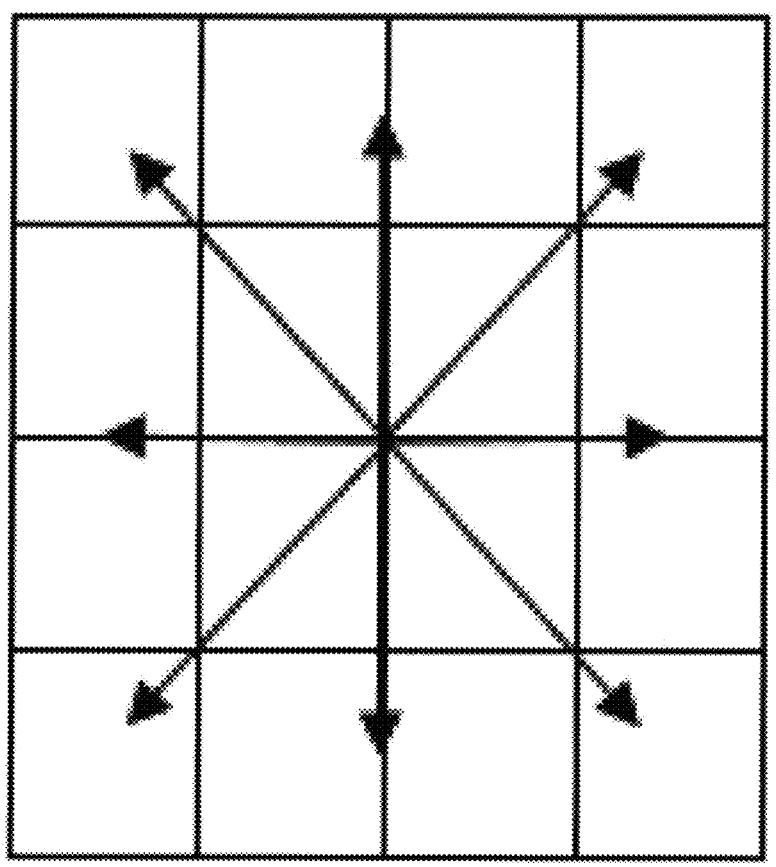
FIG. 5 is an illustration of the searching directions for a path between two marker points.

To find the potential curve between two marker points to implement a curve detection method for the first new technique, a shortest path method to find a path between two marker points may be used by the method 100. In order to evaluate the cost of each candidate path, three parameters are taken into consideration: the length of the respective path, the average intensity of the measure points in the path, and the curvature of the path. The cost function is defined by the following:

$$\text{Cost}(\text{path}_i) = \alpha \times \text{Length} + \beta \times \text{average}(\text{weight}) + \gamma \times \text{curvature} \quad (3),$$

where weight is the maximum intensity of a ridge image minus the intensity of a respective current point, and the ridge image is generated, for example, from the tensor voting steps described above. The curvature is calculated by three connected measure points in the path. The line detection method/algorithm starts from one of the marker points, which serves as the starting point. The starting point neighbors are found from eight directions which are depicted in FIG. 5. The searching step size is defined as 2. The method/algorithm extends from the starting point to its neighbors to find the path with the smallest cost. For the first search, the path includes the starting point and one of its neighbors. The method/algorithm stops when the next extended point is the second marker point.

Figure 6B:
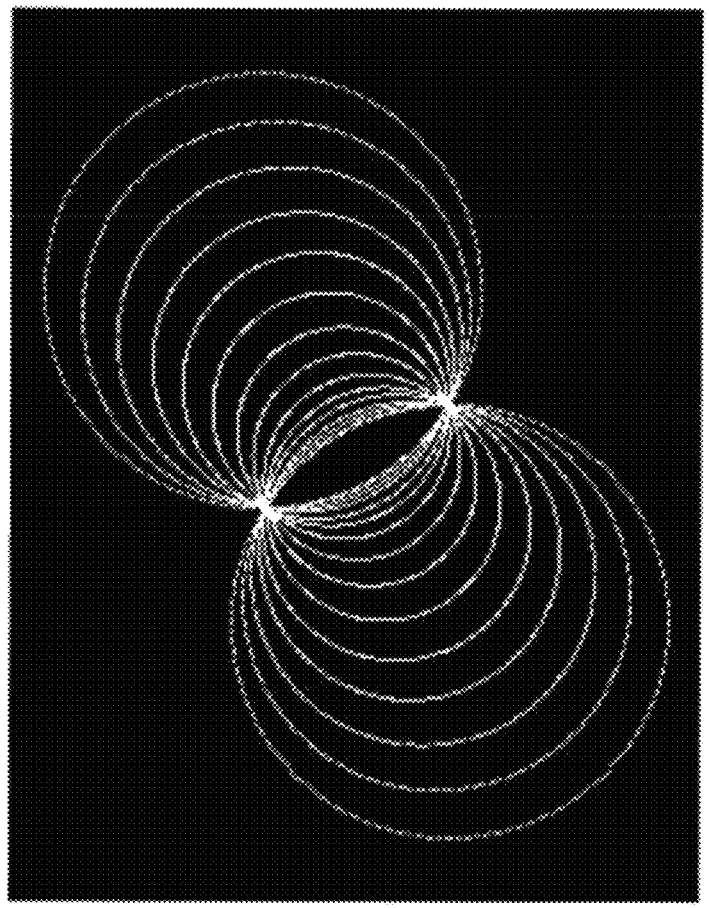
Figure 6A:
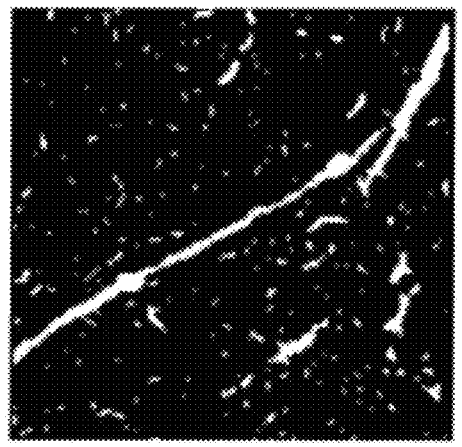
FIG. 6a is a typical ridge image of an X-ray stent image.

The model-based approach to detect the guide-wire between two marker points is described below. As noted above, the model-based wire detection approach creates models with different shapes and finds the best matched model based on the shape of the respective guide-wire. Consequently, one of main factors which has an impact on the success of guide-wire detection is the precise shape of the respective guide-wire. The novel technique assumes that it can be modeled by a set of parametric curves. Specifically, the models are defined as the arcs which go through two marker points. FIG. 6a illustrates the ridge image generated from tensor voting and FIG. 6b illustrates an example of the curve models generated from two marker points. After the models are generated, the models are compared with the ridge image to find the best matched model. In order to do the comparison, a probabilistic point distribution function is defined as $$p(x, y) = \frac{1}{M} \sum_{j=1}^{M} K\left( \begin{bmatrix} x \\ y \end{bmatrix}; \begin{bmatrix} mx_j \\ my_j \end{bmatrix}, \sigma^2 \begin{bmatrix} 1 & 0 \\ 0 & 1 \end{bmatrix} \right) \quad (4)$$

Figure 7:
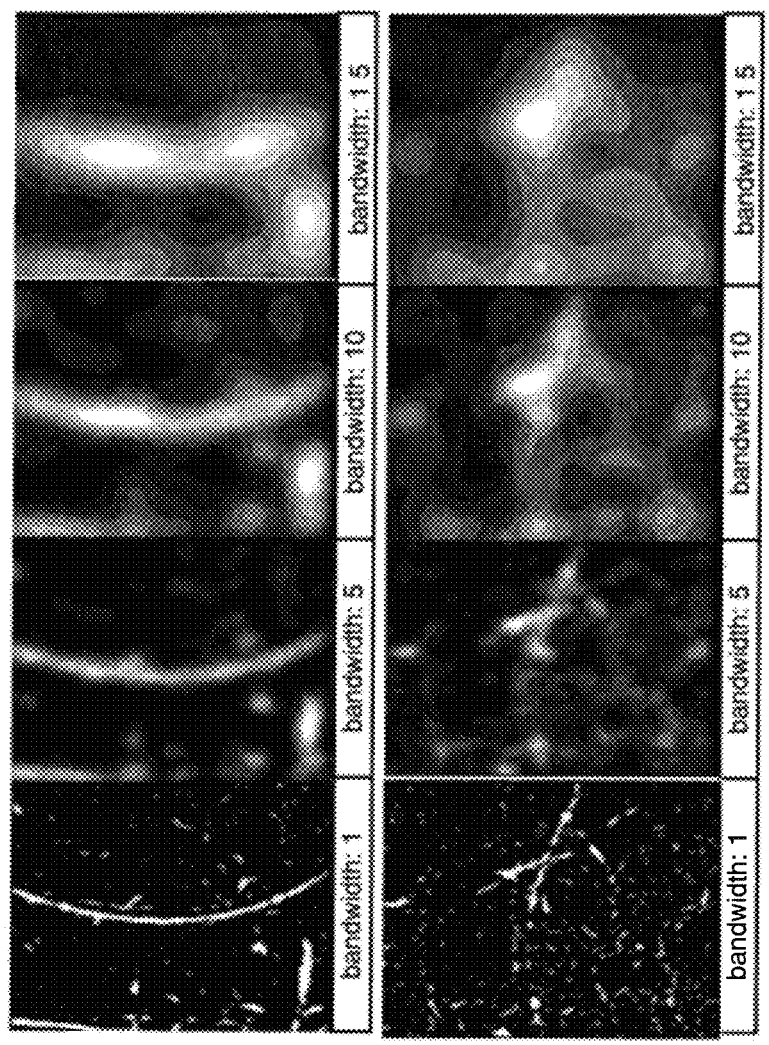
FIG. 7 shows experimentally-resulting probability maps used in a model-based technique to detect the guide-wire between two marker points.
Figure 8A:
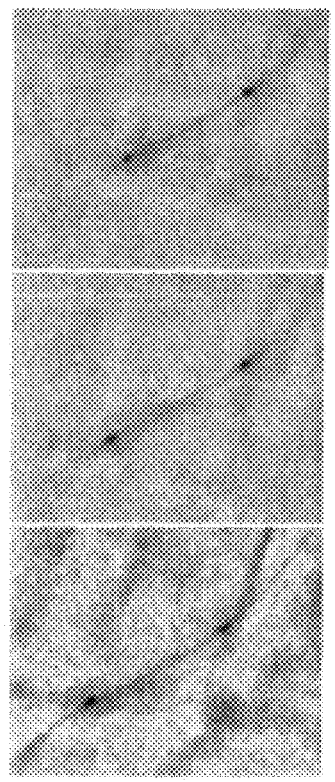
FIGS. 8a through 8f each show experimentally-resulting images of a respective X-ray stent image taken at different steps of the method of FIG. 3.
Figure 8B:
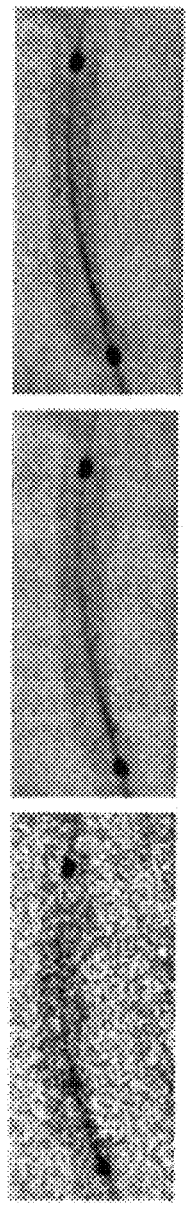
Figure 8C:
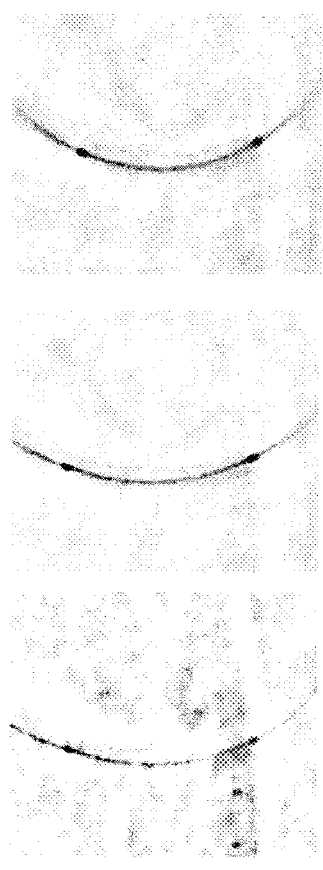
Figure 8D:
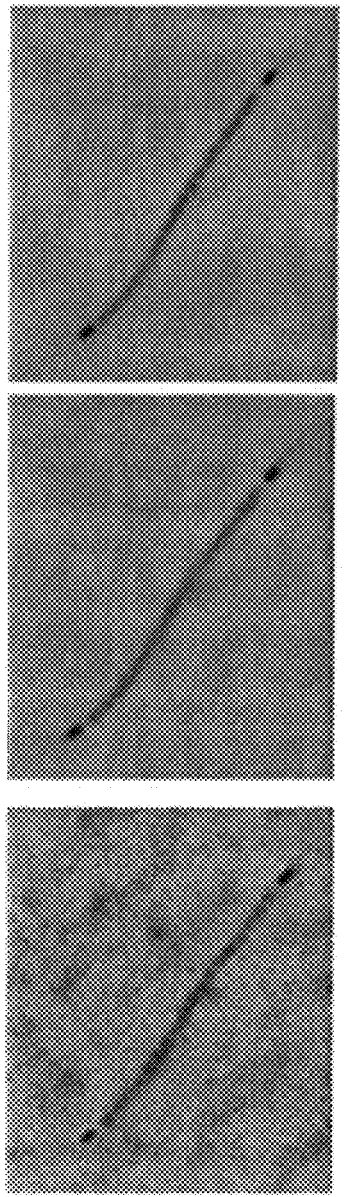
Figure 8E:
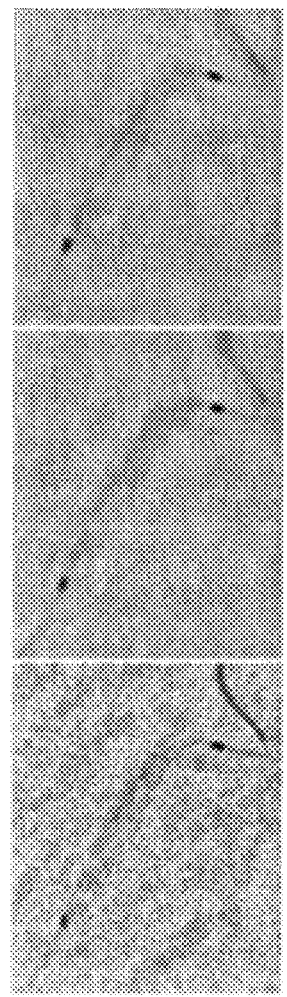
Figure 8F:
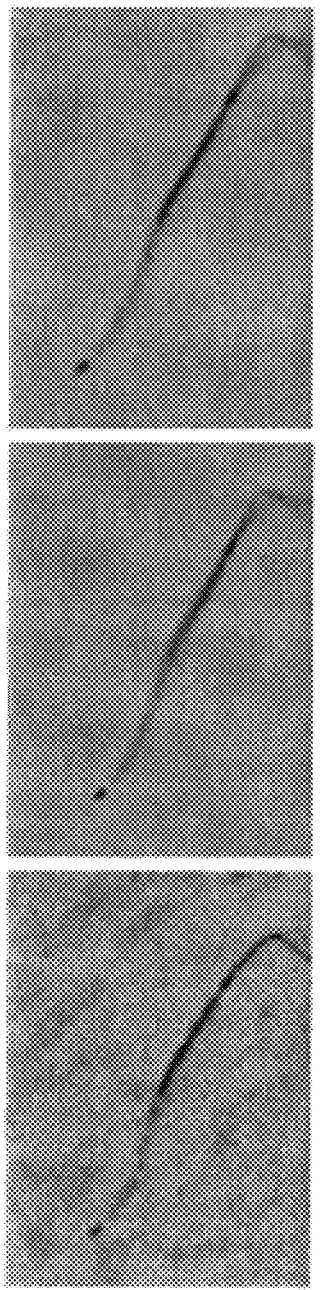

-continued $$= \frac{1}{M}\sum_{j=1}^{M} \frac{1}{2\pi\sigma^2} \exp\left(-\frac{(x-mx_j)^2 + (y-my_j)^2}{2\sigma^2}\right)$$

where $$K\left(\begin{bmatrix} x \\ y \end{bmatrix}; \begin{bmatrix} x_j \\ y_j \end{bmatrix}, \sigma^2 \begin{bmatrix} 1 & 0 \\ 0 & 1 \end{bmatrix}\right)$$

is a Gaussian kernel with mean $$\begin{bmatrix} x_j \\ y_j \end{bmatrix}$$

and bandwidth $\sigma^2$, $(mx_j, my_j)$ represents the j-th point on the curve model, and M is the total number of points on the curve model. To compare how well a curve model matches the ridge image, a probabilistic similarity measure is defined using the following:

$$p = \frac{1}{N}\sum_i p_j^M(x_i, y_i) \quad (5)$$

$$= \frac{1}{MN}\sum_i \sum_j \frac{1}{2\pi\sigma^2} \exp\left(\frac{-((x_i - mx_j)^2 + (y_i - my_j)^2)}{2\sigma^2}\right)$$

where $(x_i, y_i)$ represents the i-th data point in the ridge image, and N is the total number of points in the ridge image. FIG. 7 shows the probability maps for bandwidths 1, 5, 10 and 15, resulting from experiments conducted for the method 100 using these values. The curve model that has the highest similarity measure is determined to be an approximation of the guide-wire location in the corresponding stent image. Using the model-based approach, the approximate location of the guide-wire is determined in each stent image, and point to point correspondences on the guide-wire are established between two stent images. The point to point correspondences are used to establish the initial deformation field between two stent images.

As noted above, the final step 116 of the method 100 is the performance of a non-rigid alignment of the multiple stent images. This is now described in more detail. The multi-level B-spline approximation (MBA) is used to estimate the deformable stent motion (the general MBA process is described more fully in an article by S. Lee, G. Wolberg and S. Y. Shin, entitled "Scattered data interpolation with multi-level B-splines", IEEE Trans. Visualization and Computer Graphics, Vol. 3, No. 3, pp. 228-244, 1997, which is hereby incorporated by reference). Briefly, one of rigidly aligned stent images is randomly selected as the reference image. For each level B-spline, the deformation function between the reference stent image and each temporal stent image is computed by gradient descent. The multilevel B-spline algorithm begins by estimating a smooth version of the deformation function and propagates through finer levels to achieve a close estimation of the deformation function. The method 100 may use three (3) levels B-spline to find the initial correspondences of multiple stent images based on the control points selected from the respective guide-wire. A hierarchy of control lattices $\phi_1$, $\phi_2$, and $\phi_3$ is computed and the spacing between control points is reduced from one lattice to the next.

The final step 116 also performs stent-based elastic registration. The objective of the stent-based elastic registration is to use local image information around the stent to derive the deformation field that best relates multiple image signals in the stent area. The details of stent-based elastic registration can be found in an article by Y. Zhu, C. Chefd'Hotel, and P. Durlak, entitled "Deformable Motion Correction for Stent Visibility Enhancement", MICCAI 2011 Workshop: Computer Vision for Intravascular and Intracardiac Imaging Organizers, 2011, which is hereby incorporated by reference.

Experiments or simulations have been conducted to demonstrate the method 100 and the principle of the present invention. In the experiments, multiple aligned stent images were integrated to generate a single stent image which has enhanced contrast and reduced noise. In order to evaluate the effect of the method 100, a visual comparison is made of the image quality and stent visibility of temporal integration results of rigid alignment as well as the temporal integration results of non-rigid alignment. Exemplary experimental results are shown in FIGS. 8a through 8f. For each case (i.e., each figure), three images were created for comparison. The first image (the one to the left in each figure) is the reference image (of the stent and guide-wire). The second image (the center one in each figure) is the temporal integration of the image aligned by marker-based rigid registration. The third image (the one to the right in each figure) is the temporal integration of the image non-rigidly aligned by applying MBA and stent-based elastic registration. The three images have the same settings of window center and window width for display.

Advantageously, the method 100 combines automatic guide-wire detection, tracking, and contrast enhancement. Automatic wire detection may include a line detection method with the weighted shortest path or a model based wire detection approach. After locating the guide-wire for each image frame, motion tracking aims at following the movement of a respective stent which is around the guide-wire, as it moves from frame to frame. Through the motion correction of guide-wires, the method 100 aligns the stent in its corresponding location throughout the sequence of frames.

Other modifications are possible within the scope of the invention. For example, the subject patient to be scanned may be a human subject, animal subject or any other suitable object. Also, although the steps of the method 100 or other methods have been described in a specific sequence, the order of the steps may be re-ordered in part or in whole and the steps may be modified, supplemented, or omitted as appropriate. Also, the method 100 or other methods may use various well known algorithms and software applications to implement the steps and substeps. Further, the method 100 or other methods may be implemented in a variety of algorithms and software applications. Further, the method 100 or other methods may be supplemented by additional steps or techniques. It is also understood that the method 100 or other methods may carry out all or any of the steps using real-time data, stored data from a data archive or database, data from a remote computer network, or a mix of data sources.

Also, the various described instrumentation and tools are conventional and well known. They may be configured and interconnected in various ways as necessary or as desired. Further, although in the described method 100 or other methods the user may use self-contained instrumentation and tools, the user may use other instrumentation or tools in combination with or in place of the instrumentation and tools described for any step or all the steps of the respective method, including those that may be made available via telecommunication means. Further, the described method 100 or other methods, or any respective steps, may be carried out automatically by appropriate instrumentation and tools or with some manual intervention.

Further, the C-arm gantry arrangement 58 may be rotatable to allow rotational X-ray imaging techniques for 3D angiography. Briefly, as a result of the rotation of the C-arm 58, the X-ray source 54 and the X-ray detector 56 are moved about the patient 60 and the table 62 in a coordinated manner so that the X-ray projections of the vasculature structure of the patient 60 can be generated from different angular directions and a series of 2D X-ray projections of the coronary area are acquired along an arced path.

What is claimed is:

1. A method of image quality enhancement for X-ray stent images, comprising:
    locating the guide-wire, associated with a respective stent, for each X-ray image frame in a sequence of frames, based on ridge images acquired through extracting edges from original stent images;
    tracking the movement of the respective stent as the stent moves from frame to frame; and
    aligning the stent in its corresponding location throughout the sequence of frames,
    wherein acquiring ridge images comprises:
    a. implementing a ridge filtering algorithm to the image sequence for ridge detection for each image;
    b. applying the algorithm on multiple bandwidths;
    c. combining the results on a plurality of bandwidths into a ridge image for each image;
    d. performing tensor voting for the ridge images by applying a Hessian matrix; and obtaining a ridge image with a respective gap-filled guide-wire.

2. The method of claim 1, wherein locating the guide-wire comprises a curve detection with the weighted shortest path or a model-based guide-wire detection.

3. The method of claim 2, wherein locating the guide-wire by a curve detection with the weighted shortest path comprises finding the weighted shortest path between two marker points that delimit the position and extent of the guide-wire and the stent.

4. The method of claim 3, wherein finding the weighted shortest path comprises evaluating the cost of each candidate path by taking into consideration the length of the respective path, the average intensity of the measure points in the path, and the curvature of the path.

5. The method of claim 2, wherein locating the guide-wire by a model-based guide-wire detection comprises creating models of a guide-wire with different shapes and finding the best matched model based on the shape of the respective guide-wire.

6. The method of claim 5, wherein creating guide-wire models comprises modeling a respective guide-wire by a set of parametric curves defined as arcs which go through two marker points that delimit the position and extent of the guide-wire and the stent.

7. The method of claim 6, wherein finding the best matched model comprises comparing the created models with a ridge image, said ridge image being acquired through extracting edges from a respective original stent image.

8. The method of claim 1, wherein aligning the stent comprises performing motion correction of the guide-wires.

9. A method of image quality enhancement for X-ray stent images, comprising:
    locating the guide-wire, associated with a respective stent, for each X-ray image frame in a sequence of frames;
    tracking the movement of the respective stent as the stent moves from frame to frame; and
    aligning the stent in its corresponding location throughout the sequence of frames, wherein locating the guide-wire comprises finding the weighted shortest path between two marker points that delimit the position and extent of the guide-wire and the stent, and finding the weighted shortest path comprises evaluating the cost of each candidate path by taking into consideration the length of the respective path, the average intensity of the measure points in the path, and the curvature of the path.

10. The method of claim 9, wherein evaluating the cost of each candidate path comprises using a cost function defined by the following:

$$\mathrm{Cost}(\mathrm{path}_i) = \alpha \times \mathrm{Length} + \beta \times \mathrm{average}(\mathrm{weight}) + \gamma \times \mathrm{curvature},$$

where Length is the length of a respective path;
weight is the maximum intensity of a ridge image minus the intensity of a respective current point, said ridge image being acquired through extracting edges from a respective original stent image, and
curvature is calculated by three connected measure points in the path.

11. The method of claim 9, wherein a candidate path comprises, at least, one of the marker points as the starting point, a neighbor of the starting point, and the second marker point.

12. The method of claim 9, wherein aligning the stent comprises performing motion correction of the guide-wires.

13. The method of claim 9, wherein locating the guide-wire is based on ridge images acquired through extracting edges from original stent images.

14. The method of claim 13, wherein acquiring ridge images comprises:
    a. implementing a ridge filtering algorithm to the image sequence for ridge detection for each image;
    b. applying the algorithm on multiple bandwidths;
    c. combining the results on a plurality of bandwidths into a ridge image for each image;
    d. performing tensor voting for the ridge images by applying a Hessian matrix; and
    e. obtaining a ridge image with a respective gap-filled guide-wire.

15. A method of image quality enhancement for X-ray stent images, comprising:
    locating the guide-wire, associated with a respective stent, for each X-ray image frame in a sequence of frames, by modeling a respective guide-wire by a set of parametric curves defined as arcs which go through two marker points that delimit the position and extent of the guide-wire and the stent, and comparing the created models with a ridge image, said ridge image being acquired through extracting edges from a respective original stent image;
    tracking the movement of the respective stent as the stent moves from frame to frame; and
    aligning the stent in its corresponding location throughout the sequence of frames,
    wherein comparing the created models with a ridge image comprises using a similarity measure defined by the following equation:

$$\frac{1}{MN} \sum_i \sum_j \frac{1}{2\pi\sigma^2} \exp\left(\frac{-((x_i - mx_j)^2 + (y_i - my_j)^2)}{2\sigma^2}\right),$$

where $(x_i, y_i)$ represents the respective data point in the ridge image;

$(mx_j, my_j)$ represents the corresponding point on the curve model;

N is the total number of points in the ridge image;

M is the total number of points on the curve model; and $\sigma^2$ is the bandwidth of the Gaussian kernel used to define the model.

16. The method of claim 15, wherein locating the guide-wire is based on ridge images acquired through extracting edges from original stent images.

17. The method of claim 16, wherein acquiring ridge images comprises:
 a. implementing a ridge filtering algorithm to the image sequence for ridge detection for each image;
 b. applying the algorithm on multiple bandwidths;
 c. combining the results on a plurality of bandwidths into a ridge image for each image;
 d. performing tensor voting for the ridge images by applying a Hessian matrix; and
 e. obtaining a ridge image with a respective gap-filled guide-wire.

18. The method of claim 15, wherein aligning the stent comprises performing motion correction of the guide-wires.

* * * * *